US011990731B2

(12) United States Patent
Francis et al.

(10) Patent No.: US 11,990,731 B2
(45) Date of Patent: May 21, 2024

(54) SPARK PLUG ELECTRODE AND METHOD OF MANUFACTURING SAME

(71) Applicant: Federal-Mogul Ignition LLC, Southfield, MI (US)

(72) Inventors: David L. Francis, Sperry, IA (US); Scott J. Myers, Burlington, IA (US); Joshua S. Farley, Mt. Pleasant, IA (US)

(73) Assignee: FEDERAL-MOGUL IGNITION LLC, Southfield, MI (US)

( * ) Notice: Subject to any disclaimer, the term of this patent is extended or adjusted under 35 U.S.C. 154(b) by 252 days.

(21) Appl. No.: 17/603,128

(22) PCT Filed: Apr. 29, 2020

(86) PCT No.: PCT/US2020/030566

§ 371 (c)(1),
(2) Date: Oct. 12, 2021

(87) PCT Pub. No.: WO2020/223413

PCT Pub. Date: Nov. 5, 2020

(65) Prior Publication Data

US 2022/0200246 A1 Jun. 23, 2022

(51) Int. Cl.
*H01T 13/32* (2006.01)
*H01T 13/16* (2006.01)
(Continued)

(52) U.S. Cl.
CPC ............. *H01T 13/32* (2013.01); *H01T 13/16* (2013.01); *H01T 13/39* (2013.01); *H01T 21/02* (2013.01)

(58) Field of Classification Search
CPC ......... H01T 13/32; H01T 13/16; H01T 13/39; H01T 21/02; H01T 13/20; H01T 13/34
See application file for complete search history.

(56) References Cited

U.S. PATENT DOCUMENTS 4,526,551 A 7/1985 Hoffmanner et al.
4,606,730 A 8/1986 Kin et al.
(Continued)

FOREIGN PATENT DOCUMENTS

CA 1326185 C 1/1994
CN 1052577 A 6/1991
(Continued)

OTHER PUBLICATIONS

International Preliminary Report on Patentability issued for PCT/US2020/030566 on Nov. 11, 2021.
(Continued)

*Primary Examiner* — Zheng Song
*Assistant Examiner* — Glenn D Zimmerman
(74) *Attorney, Agent, or Firm* — REISING ETHINGTON P.C.

(57) ABSTRACT

A spark plug electrode includes a thermally conductive core portion and a weldable core portion that are aligned in series within a multi-piece core assembly to improve the heat management and attachment characteristics of the electrode. The thermally conductive core portion, which can be made from a copper-based material, is located towards a firing end of the ground electrode. The weldable core portion can be made from a nickel-based material and is located towards a welding end of the ground electrode. A method of manufacturing is also described for extruding and forming the spark plug electrode with the multi-piece core assembly. The method is designed so that a core interface between the thermally conductive core portion and the weldable core portion does not substantially include any internal voids, and a welding surface where the electrode is attached to a spark plug shell has a nickel-to-nickel interface, but does not substantially include any copper.

19 Claims, 4 Drawing Sheets

(51) Int. Cl.
*H01T 13/39* (2006.01)
*H01T 21/02* (2006.01)

(56) References Cited

U.S. PATENT DOCUMENTS

| | | | | |
|---|---|---|---|---|
| 4,931,686 | A | 6/1990 | Oakley | |
| 5,210,457 | A * | 5/1993 | Oshima | H01T 21/02 313/142 |
| 5,310,373 | A | 5/1994 | Treiber et al. | |
| 5,743,777 | A | 4/1998 | Demeuter | |
| 5,918,571 | A | 7/1999 | Below | |
| 6,121,719 | A | 9/2000 | Matsutani et al. | |
| 6,523,515 | B2 | 2/2003 | Kanao | |
| 7,023,127 | B2 | 4/2006 | Hiramatsu | |
| 7,741,762 | B2 | 6/2010 | Alger, II et al. | |
| 8,237,341 | B2 | 8/2012 | Freeman et al. | |
| 8,987,981 | B2 | 3/2015 | Imai | |
| 9,441,604 | B2 | 9/2016 | Zheng | |
| 10,290,999 | B2 | 5/2019 | Koike et al. | |
| 10,826,279 | B1 * | 11/2020 | Santana | H01T 13/39 |
| 2001/0030494 | A1 | 10/2001 | Kanao | |
| 2005/0174025 | A1 | 8/2005 | Okamoto | |
| 2008/0122334 | A1 | 5/2008 | Kishimoto et al. | |
| 2009/0289540 | A1 * | 11/2009 | Nunome | H01T 13/32 313/141 |
| 2010/0096968 | A1 | 4/2010 | Ban et al. | |
| 2011/0012499 | A1 | 1/2011 | Suzuki et al. | |
| 2011/0095672 | A1 | 4/2011 | Ban et al. | |
| 2014/0232254 | A1 * | 8/2014 | Ma | H01T 13/20 148/414 |
| 2015/0002011 | A1 * | 1/2015 | Imai | H01T 13/39 313/142 |
| 2017/0025822 | A1 * | 1/2017 | Koike | H01T 13/32 |
| 2018/0294624 | A1 | 10/2018 | Niessner et al. | |
| 2018/0294626 | A1 | 10/2018 | Niessner et al. | |

FOREIGN PATENT DOCUMENTS

| | | | | |
|---|---|---|---|---|
| CN | 2705929 | Y | 6/2005 | |
| CN | 104836120 | A | 8/2015 | |
| CN | 106374340 | A | 2/2017 | |
| DE | 3036226 | A1 | 4/1981 | |
| DE | 3433031 | A1 | 4/1985 | |
| DE | 112015000475 | T5 * | 10/2016 | C22C 19/03 |
| EP | 0134355 | A1 | 3/1985 | |
| EP | 2477286 | A2 | 7/2012 | |
| FR | 2633108 | A3 | 12/1989 | |
| GB | 1533278 | A | 11/1978 | |
| GB | 2060454 | A | 5/1981 | |
| JP | H04319283 | A | 11/1992 | |
| JP | 2923672 | B2 | 7/1999 | |
| JP | 3071236 | B2 | 7/2000 | |
| JP | 2005063705 | A | 3/2005 | |
| JP | 4103817 | B2 | 6/2008 | |
| WO | WO9700547 | A1 | 1/1997 | |
| WO | WO-2016026671 | A1 * | 2/2016 | H01T 13/16 |
| WO | 2018103912 | A1 † | 6/2018 | |
| WO | WO2018103912 | A1 | 6/2018 | |
| WO | WO-2018103912 | A1 * | 6/2018 | H01T 13/16 |

OTHER PUBLICATIONS

International Search Report and Written Opinion issued for PCT/US2020/030566 on Aug. 12, 2020.
Third Party Observation submitted at the German Patent Office for application DE 11 2020 002 185.8 on Feb. 27, 2023.
English translation of the Third Party Observation submitted at the German Patent Office for application DE 11 2020 002 185.8 on Feb. 27, 2023.
Office action issued by the China National Intellectual Property Administration (CNIPA) 202080031524.0 on Mar. 4, 2022; 11 pages.
Second Office action issued by the China National Intellectual Property Administration (CNIPA) 202080031524.0 on Sep. 22, 2022.

* cited by examiner
† cited by third party

SPARK PLUG ELECTRODE AND METHOD OF MANUFACTURING SAME

RELATED APPLICATION

This application claims the priority of U.S. provisional application No. 62/840,642, filed Apr. 30, 2019, the entire contents of which are hereby incorporated by reference.

FIELD

The present disclosure generally relates to spark plugs, industrial plugs, and other ignition devices and, in particular, to spark plug electrodes that have a multi-piece core assembly.

BACKGROUND

Spark plug ground electrodes are primarily responsible for establishing a ground plane for spark initiation within a combustion chamber. Accordingly, the ground electrode must be capable of withstanding temperatures in excess of 900° C., the corrosive environment of combustion by-products, and the mechanical shock of the combustion event itself. Traditional ground electrode designs address these issues by using a high-strength nickel alloy that is co-extruded with an internal copper core. The nickel-based sheath survives the environment, while the copper-based core provides the heat transfer conduit.

FIG. 8 schematically illustrates a conventional method of forming a ground electrode 418, wherein the copper-based core only consists of a single heat transfer portion 442. A copper-based billet 452 is inserted into a nickel-based sheath cup 454, and the combined billet and sheath cup assembly 456 is then extruded. The copper-based heat transfer core portion 442 is completely encased by the nickel-based sheath 440, which is desirable since exposure of copper at the welding end 426 can drastically reduce weld strength as the copper can contaminate the weld pool. However, completely encasing the copper-based heat transfer core portion 442 can involve challenges and/or structural defects.

Many extrusion methods create voids as the nickel-based sheath cup 454 forms around the copper-based billet 452 during extrusion of the billet and sheath cup assembly 456 into the extrudate 458. As shown, one or more cup collapse voids 460 can form as the billet and sheath cup assembly 456 is extruded in the extruding direction 462. The cup collapse voids 460 result from incomplete collapsing of the nickel-based sheath 440 around the heat transfer portion 442 and may be caused by foreign material (e.g., air or oil) getting trapped inside, or by material flow not completely filling the space. The voids 460 can negatively impact ground electrode performance. For example, they can inhibit the ability of the ground electrode to transfer heat (i.e., its thermal conductivity) and they can undesirably impact core placement, which in turn can impact core measurement for trimming purposes. Additionally, the voids 460 may be responsible for high variability in weld strength when the ground electrode 418 is welded to the shell 416, as variability can be related to the inconsistency of random voids 460 in the resistance weld circuit.

The spark plug electrode and method of manufacturing described herein are designed to address one or more of the aforementioned challenges.

SUMMARY

According to one aspect, there is provided a spark plug electrode, comprising: a firing end; a welding end; a multi-piece core assembly at least partially extending between the firing end and the welding end and having a thermally conductive core portion and a weldable core portion, the thermally conductive core portion is located closer to the firing end than is the weldable core portion and is configured to conduct heat within the electrode, the weldable core portion is located closer to the welding end than is the thermally conductive core portion and is configured to be welded to a spark plug shell; and a cladding at least partially surrounding the multi-piece core assembly, wherein the thermally conductive core portion and the weldable core portion are arranged in series within the multi-piece core assembly.

According to various embodiments, the spark plug electrode may further include any one of the following features or any technically-feasible combination of some or all of these features:

- the thermally conductive core portion is made of a copper-based material;
- the thermally conductive core portion is longer than the weldable core portion;
- the electrode is a ground electrode and the thermally conductive core portion includes a first end and a second end, the thermally conductive core portion extends from the first end, through a bend in the ground electrode, and terminates at the second end where there is a core interface with the weldable core portion;
- further comprising a firing tip attached to a side surface of the ground electrode configured to face a spark gap, wherein the first end of the thermally conductive core portion is located between 1.50 mm and 7.00 mm, inclusive, from a distal end surface of the firing end (dimension X) so that it is not located underneath the firing tip, the second end of the thermally conductive core portion is located 1.02 mm or less from a welding surface of the welding end (dimension Y) at a core interface of the thermally conductive core portion and the weldable core portion, and the average thickness of the thermally conductive core portion is between 0.25 mm and 1.52 mm, inclusive (dimension A);
- the weldable core portion is made of a nickel-based material;
- the cladding is made of a different nickel-based material than is the weldable core portion, and the weight percentage of nickel in the weldable core portion is higher than the weight percentage of nickel in the cladding;
- the weldable core portion is made of a nickel-based material that includes 98 wt % or more of nickel;
- the electrode is a ground electrode and the weldable core portion includes a first end and a second end, the weldable core portion extends from the first end where it is in contact with the thermally conductive core portion and terminates at the second end where there is a welding surface configured for attachment to the spark plug shell;
- the first end of the weldable core portion is located 1.02 mm or less from a welding surface of the welding end (dimension Y) at a core interface of the thermally conductive core portion and the weldable core portion, and the average thickness of the weldable core portion is between 0.25 mm and 1.52 mm, inclusive (dimension B);
- the welding surface includes a nickel-to-nickel interface between the weldable core portion and the cladding, but does not substantially include any copper;

the thermally conductive core portion engages the weldable core portion at a core interface located within the multi-piece core assembly, and the core interface does not substantially include any internal voids;

the core interface is located 1.02 mm or less from a welding surface of the welding end (dimension Y);

the core interface is completely encapsulated by the cladding;

the multi-piece core assembly further includes one or more additional core portion(s) that are arranged with the thermally conductive core portion and the weldable core portion in series within the multi-piece core assembly;

the electrode is a ground electrode that is straight and extends perpendicular to a longitudinal axis of the shell, the thermally conductive core portion extends from a first end to a second end located at a core interface, the weldable core portion extends from a first end located at the core interface to a second end that includes a welding surface, and the welding surface is configured for welding to at least one of the shell or a connecting piece;

the welding surface includes a nickel-to-nickel interface between the weldable core portion and the cladding, but does not substantially include any copper; and a spark plug, comprising: the spark plug electrode, a metallic shell having an axial bore and a free end; an insulator at least partially retained within the axial bore of the metallic shell and having an axial bore; and a center electrode at least partially retained within the axial bore of the insulator, wherein the spark plug electrode is a ground electrode and the welding end is welded to the free end of the metallic shell.

According to another aspect, there is provided an electrode for a spark plug, comprising: a firing end; a welding end; a multi-piece core assembly at least partially extending between the firing end and the welding end and having a thermally conductive core portion, a weldable core portion, and a core interface where the thermally conductive core portion engages the weldable core portion, the thermally conductive core portion is made of a copper-based material, the weldable core portion is made of a nickel-based material, and the core interface does not substantially include any internal voids; and a cladding at least partially surrounding the multi-piece core assembly and being made of a nickel-based material, wherein the weldable core portion has a welding surface that includes a nickel-to-nickel interface between the weldable core portion and the cladding, but does not substantially include any copper.

According to another aspect, there is provided a method of manufacturing a spark plug electrode, comprising the steps of: inserting a thermally conductive material billet and a weldable material billet into a cladding cup to form a billet and cladding cup assembly, wherein the thermally conductive material billet is made of a copper-based material and is inserted first into the cladding cup, the weldable material billet is made of a nickel-based material and is inserted second into the cladding cup, and the cladding cup is made of a nickel-based material; extruding the billet and cladding cup assembly to form an extrudate having a multi-piece core assembly, wherein the thermally conductive material billet becomes a thermally conductive core portion, the weldable material billet becomes a weldable core portion, the cladding cup becomes a cladding that at least partially surrounds the multi-piece core assembly, and the thermally conductive core portion and the weldable core portion are arranged in series within the multi-piece core assembly; and trimming the extrudate through the weldable core portion and the cladding to form a welding surface that includes a nickel-to-nickel interface between the weldable core portion and the cladding, but does not substantially include any copper.

DRAWINGS

Preferred embodiments will hereinafter be described in conjunction with the appended drawings, wherein like designations denote like elements, and wherein.

Figure 1:
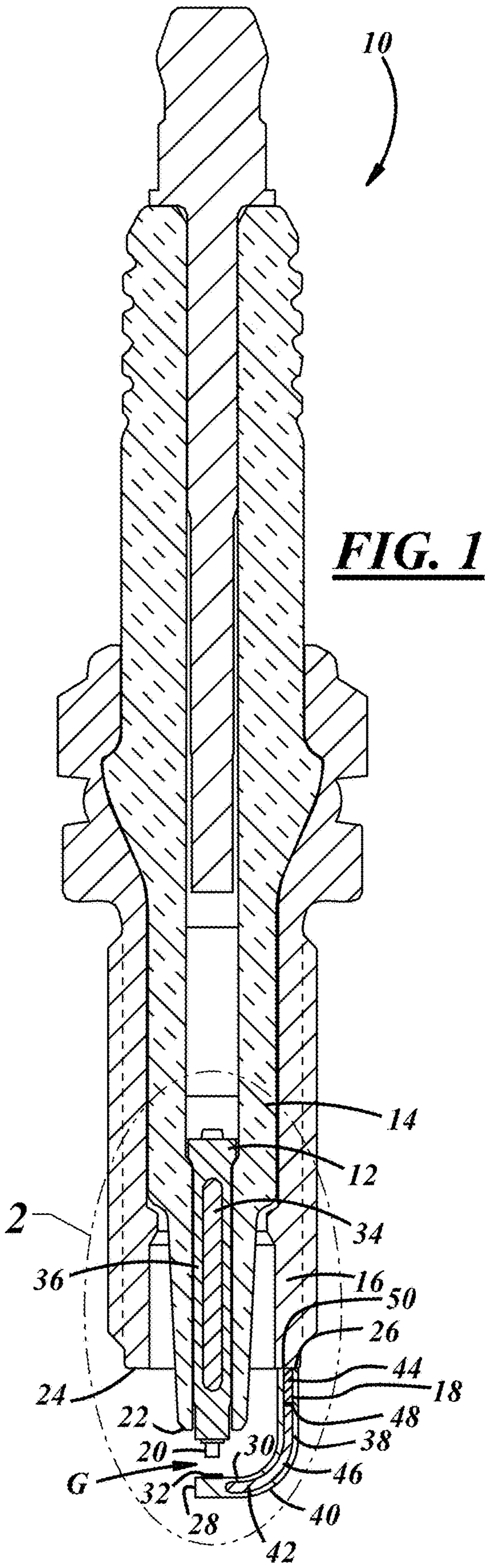
FIG. 1 is a cross-sectional view of an example of a spark plug having a ground electrode with a multi-piece core assembly.
Figure 2:
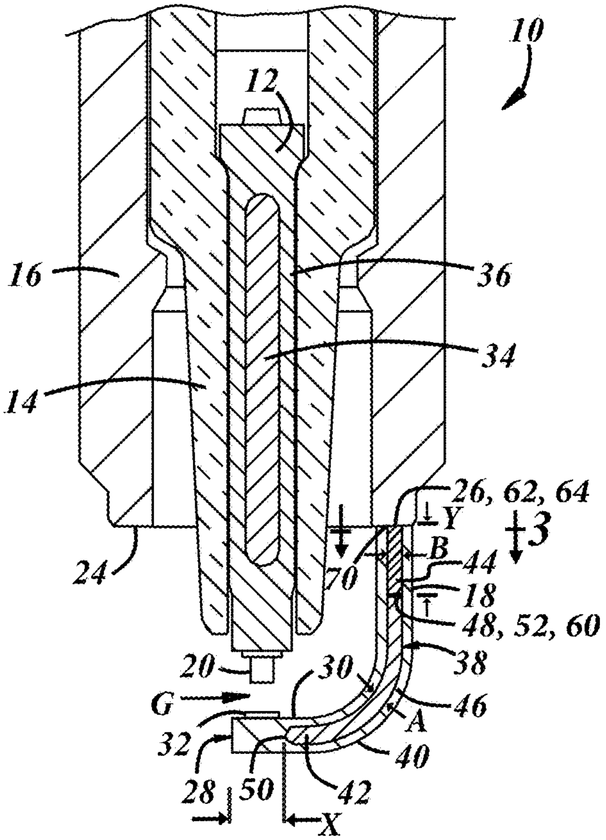
FIG. 2 is an enlarged view of the firing end of the spark plug from FIG. 1.
Figure 3:
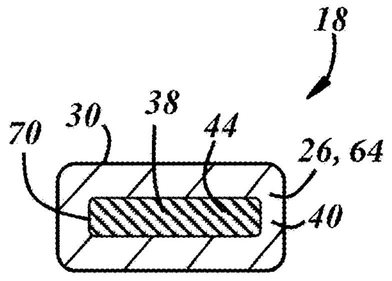
FIG. 3 is an enlarged cross-sectional view of the ground electrode from FIG. 2, taken along lines 3-3.
Figure 7:
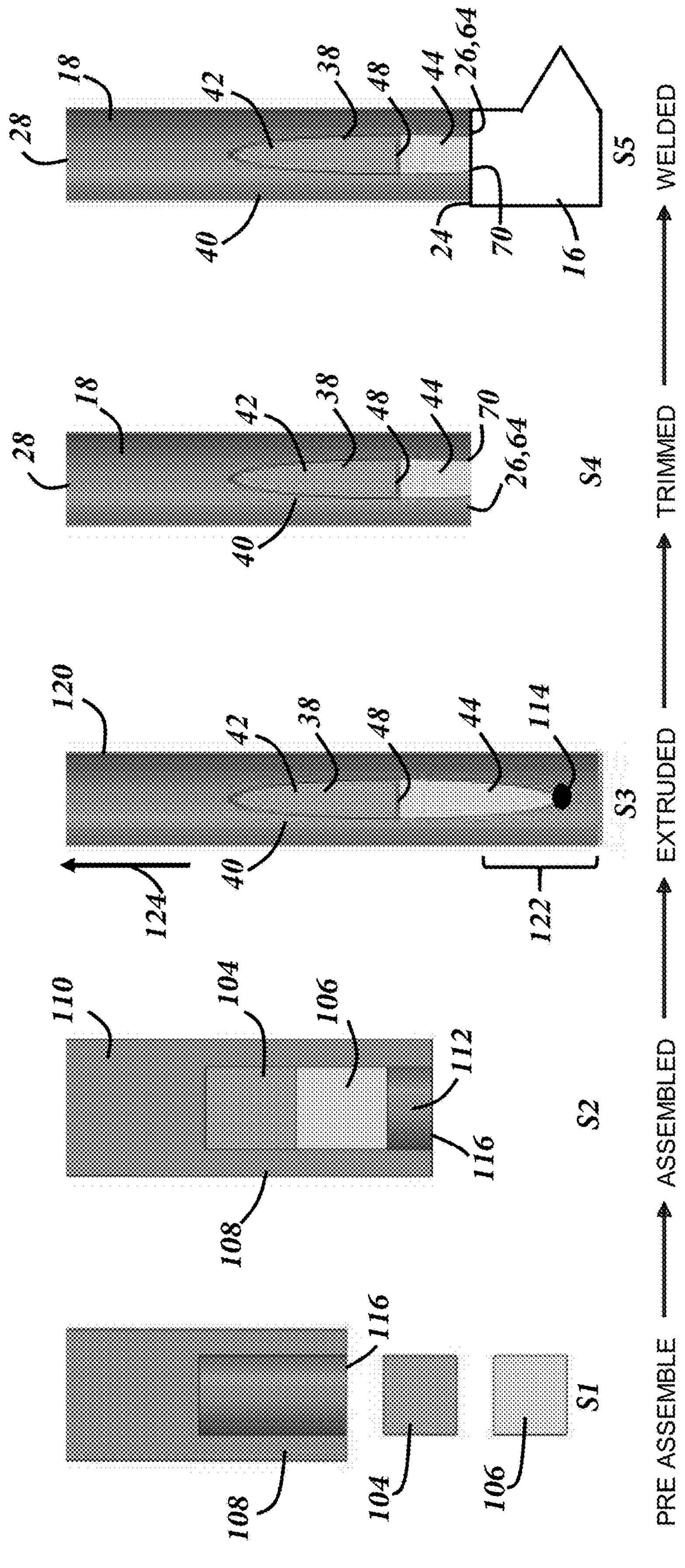
Figure 8:
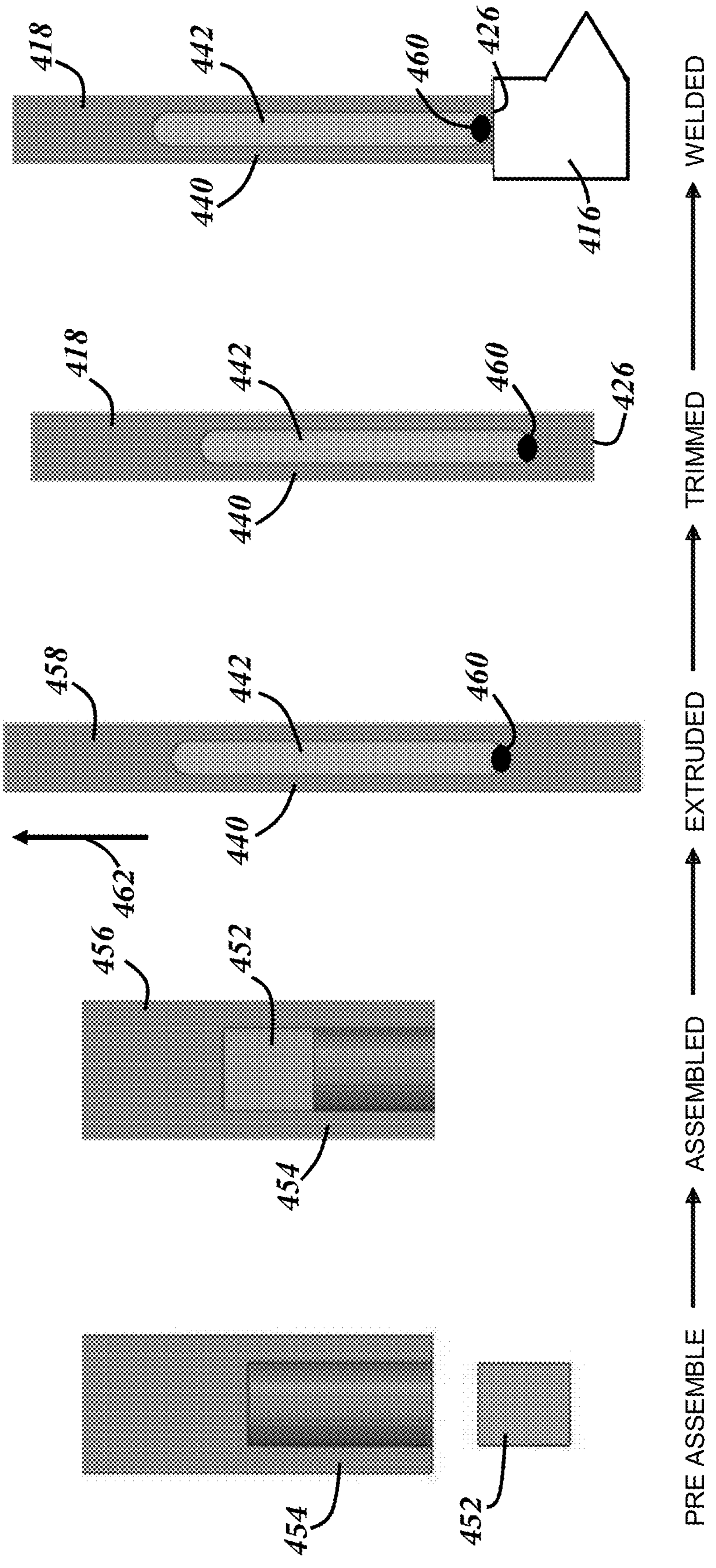
FIG. 8 (prior art)

FIG. 7 is a schematic representation of a method of manufacturing a ground electrode with a multi-piece core assembly, such as that illustrated in FIGS. 1-3, showing cross-sectional views at various stages of the method; and FIG. 8 is a schematic representation of a conventional method of manufacturing a ground electrode with a single-piece core, showing cross-sectional views at various stages of the method.

DESCRIPTION

The spark plug electrode described herein is a ground electrode and includes a thermally conductive core portion and a weldable core portion that are strategically located and aligned in series within a multi-piece core assembly to improve the heat management and attachment characteristics of the electrode. The thermally conductive core portion, which is typically made from a copper-based material, is located towards a firing end of the ground electrode where the heat is usually the greatest so that it can help remove as much thermal energy as possible. The weldable core portion, on the other hand, can be made from a nickel-based material and is located towards a welding end of the ground electrode. In one embodiment, a co-extrusion method may be used to manufacture such a ground electrode, in which case the thermally conductive core portion and the weldable core portion are initially provided in the form of billets, are inserted within a cup that is to be the electrode cladding, such as one made from a standard nickel-based material (e.g., Inconel 600, 601), and are then co-extruded to form a ground electrode with a multi-piece core assembly. The ground electrode may then be trimmed at a welding end to expose a welding surface with the weldable core portion surrounded by the cladding; it is this trimmed welding surface that can then be welded to a spark plug shell.

The spark plug electrode and the manufacturing method described herein are designed to improve heat transfer characteristics by avoiding undesirable internal voids in the multi-piece core assembly, while at the same time provide an advantageous welding surface for attachment to a spark plug shell. It should be recognized that while the following description is primarily directed to a standard J-gap ground electrode for an automotive spark plug, the invention is not so limited and may also apply to a center electrode, to an industrial spark plug, to a multi-gap spark plug, to a surface discharge or semi-creeping spark plug, or to a pre-chamber spark plug, to cite a few possibilities.

Referring to FIGS. 1-3, there is shown an example spark plug 10 that includes a center electrode 12, an insulator 14, a metallic shell 16, and a ground electrode 18. The center electrode 12 is disposed within an axial bore of the insulator 14 and includes a firing end having a firing tip 20 attached thereto that protrudes beyond a free end 22 of the insulator 14. The firing tip 20 may be a single-piece rivet that includes a sparking surface and is made from an erosion- and/or corrosion-resistant material, such as a platinum-, iridium- and/or ruthenium-based material. In other embodiments, the center electrode 12 may include a multi-piece firing tip, a cylindrical firing tip, an annular firing tip, a flat pad firing tip, or no firing tip at all, to cite several possibilities.

Insulator 14 is disposed within an axial bore of the metallic shell 16 and is constructed from a material, such as a ceramic material, that is sufficient to electrically insulate the center electrode 12 from the metallic shell 16. The free end 22 of the insulator 14 may protrude beyond a free end 24 of the metallic shell 16, as shown, or it may be retracted within the metallic shell 16.

Ground electrode 18, sometimes referred to as a base electrode member, may be constructed according to a conventional J-gap configuration, as shown in FIGS. 1 and 2, and is attached to the free end 24 of the metallic shell 16. According to this particular embodiment, the ground electrode 18 includes a welding end 26, a firing end 28 with a side surface 30 that opposes the center electrode and has a firing tip 32 attached thereto, a multi-piece core assembly 38, and a cladding 40. The firing tip 32 may be in the form of a flat pad and includes a sparking surface defining a spark gap G with the center electrode firing tip 20 such that they provide sparking surfaces for the emission and reception of electrons across the spark gap G. Firing tip 32 can be made from an erosion- and/or corrosion-resistant material, such as a platinum-, iridium- and/or ruthenium-based material, and may be provided according to any known configuration, not just the flat pad arrangement shown in the drawings.

The center electrode 12 and/or the ground electrode 18 may include a core made from a thermally conductive material and a cladding or sheath surrounding the core. The core of the center electrode 12 and/or the ground electrode 18 is preferably designed to help conduct heat away from the firing ends of the electrodes towards cooler portions of the spark plug 10. In the embodiment shown in FIGS. 1-3, the center electrode 12 includes a copper-based core 34 entirely encased within a cladding 36, and the ground electrode 18 includes a multi-piece core assembly 38 at least partially surrounded by a cladding 40. It should be noted, however, that the thermally conductive cores 34, 38, as well as the center and/or ground electrodes themselves, may take on any of a variety of shapes, sizes and/or configurations, including ones other than those shown in the drawings. For example, the center electrode 12 may not include a core in some embodiments, or it may include a multi-piece core assembly, similar to the one shown with the ground electrode 18. It should be appreciated that while the following description of the multi-piece core assembly 38 is provided in the context of the ground electrode 18, the invention is not so limited and such teachings apply to the center electrode as well.

Multi-piece core assembly 38 extends at least partially between the welding end 26 and the firing end 28 and includes a thermally conductive core portion 42 and a separate weldable core portion 44. The thermally conductive core portion 42 and the weldable core portion 44 together make up the multi-piece core assembly 38 and are designed in such a way that the ground electrode 18 can sufficiently manage the substantial amounts of heat generated near the firing end of the electrode, yet also provide an advantageous welding surface for attachment of the ground electrode to the shell. According to the embodiment illustrated in FIGS. 1-3, the thermally conductive core portion 42 is located closer to the firing end 28 than is the weldable core portion 44, the weldable core portion is located closer to the welding end 26 than is the thermally conductive core portion, and the thermally conductive core portion and the weldable core portion are arranged in series within the multi-piece core assembly. As used herein, the phrase "in series within the multi-piece core assembly," means that one end of a first core portion is aligned with another end of a second core portion (i.e., end-to-end, as illustrated in the drawings), as opposed to an arrangement where a first core portion surrounds or encapsulates a second core portion. It should be appreciated, however, that numerous other embodiments are possible, including the non-limiting examples described below.

Thermally conductive core portion 42 is made of a material with a high thermal conductivity so that it can effectively pull or convey heat away from the firing end 28 towards cooler parts of the spark plug and/or engine, such as the shell and/or cylinder head. According to one example, the thermally conductive core portion 42 is made of a copper-based material in which copper is the single largest constituent of the material by weight, and it may or may not contain other constituents (e.g., a copper-based material can be pure copper, copper with some impurities, or a copper-based alloy). Other thermally conductive materials, such as aluminum-based materials, may be used instead as the thermally conductive core portion 42 is not limited to copper-based materials. The thermally conductive core portion 42 may be completely or almost completely surrounded by the cladding 40, which is preferably a nickel-based material, such as INCONEL™ 600 or 601. The cladding 40 protects the thermally conductive core portion 42 from the extreme environment of the combustion chamber. Other materials for the cladding 40 and/or the thermally conductive core portion 42 are also possible.

The size, position and/or shape of the thermally conductive core portion 42 can be selected or engineered to achieve the specific thermal requirements or needs of a particular plug or application. For instance, in the example of FIGS. 1-3, the thermally conductive core portion 42 extends between a first end 50 that is located near the firing end 28 and a second end 52 that is located at a core interface 48 of the two core portions. The first end 50, in this particular embodiment, is not located directly under the firing tip 32; rather, the first end 50 is located slightly inboard of the firing tip (i.e., slightly towards the welding end 26) so that the thermally conductive core portion 42 does not interfere with a resistance welding process where the firing tip 32 is attached to the side surface 30 of the ground electrode 18. The thermally conductive core portion 42 may be longer than the weldable core portion 44 so that it extends from the first end 50, through the bend 46 in the ground electrode 18, and terminates at the second end 52. According to a non-limiting example, the first end 50 of the thermally conductive core portion 42 is located between 1.50 mm and 7.00 mm, inclusive, from the distal end surface of the firing end 28 (dimension X), the second end 52 is located 1.02 mm or less from the end surface of the welding end 26 (dimension Y), and the average thickness of the thermally conductive core portion is between 0.25 mm and 1.52 mm, inclusive (dimension A). Of course, the thermally conductive core portion 42 may be longer or shorter than what is illustrated; for example, the core portion 42 may be shorter and stop before the bend 46 in the ground electrode 18. It should be appreciated that the thermally conductive core portion 42 is not limited to the specific embodiment shown in the drawings and may, for example, have: a cross-sectional shape that is generally uniform or non-uniform along its length; a cross-sectional shape that is generally rectangular, oval, circular or non-circular in shape; different locations for the first and/or second ends; a different length and/or width; and it may include multiple thermally conductive core portions, instead of just one. Other embodiments are certainly possible.

Weldable core portion 44 is made of a metal that is designed to weld easily to the shell so that it can improve the weld integrity and/or strength between the ground electrode 18 and the shell 16. The weldable core portion 44 may be made of a nickel-based material in which nickel is the single largest constituent of the material by weight, and it may or may not contain other constituents (e.g., a nickel-based material can be pure nickel, nickel with some impurities, or a nickel-based alloy). According to one example, the weldable core portion 44 is made from a nickel-based material having a higher weight percentage of nickel (i.e., a greater nickel content) than the nickel-based material used for the cladding or sheath 40. For instance, the weldable core portion 44 may be made from a nickel-based material comprising 98 wt % or more nickel, whereas the cladding 40 may be made from a nickel-based material comprising 50-90 wt % nickel (e.g., INCONEL™ 600 or 601). In one particular example, the weldable core portion 44 comprises Ni200, which is a rather pure nickel alloy comprising about 99 wt % nickel, and has a higher thermal conductivity than many common cladding materials, like INCONEL™ 601. This material is highly extrudable and can be readily welded to the steel shell 16 via a resistance welding process, a laser welding process or combination thereof, particularly when surrounded by an INCONEL™ 600 or 601 sheath 40 at the welding end 26. Other materials, including those that are not nickel-based, may be used instead.

The size, position and/or shape of the weldable core portion 44 can be selected or engineered to achieve the specific electrode attachment requirements of a particular plug or application, yet not substantially inhibit the thermal properties of the electrode. In the example shown in FIGS. 1-3, the weldable core portion 44 extends between a first end 60 that is located at the core interface 48 and a second end 62 that is located at the end surface of the welding end 26. Put differently, the weldable core portion 44 is in contact with the thermally conductive core portion 42 at one end (i.e., at the core interface 48) and extends all the way to the end of the ground electrode 18 at another end (i.e., at the welding end 26). Skilled artisans will appreciate that it can be a challenge to balance the thermal needs and attachment requirements of a ground electrode, and the weldable core portion 44 helps address this. By intimately contacting the thermally conductive core portion 42 at its first end 60, the weldable core portion 44 is able to provide a certain degree of thermal continuity for the heat that is being removed from the firing end 28; and by extending all the way to the end of the ground electrode at its second end 62, the weldable core portion 44 is able to provide a welding surface 64 that does not substantially include copper, which is typically undesirable for welding to the shell. According to a non-limiting example, the first end 60 of the weldable core portion 44 is located 1.02 mm or less from the welding end 26 (same dimension Y as previously described), and the average thickness of the weldable core portion is between 0.25 mm and 1.52 mm, inclusive (dimension B). If dimension Y is too large (i.e., if the weldable core portion 44 is too long), then this may undesirably decrease the overall thermal conductivity of the multi-piece core assembly 38 and, thus, frustrate some of the objectives discussed above. Thus, the reason that the thermally conductive core portion 42 is longer than the weldable core portion 44; in some instances, core portion 42 is at least twice as long as core portion 44.

Turning to FIG. 3, there is shown a non-limiting example of a welding surface 64 at the welding end 26 of the ground electrode 18. The welding surface 64 has a nickel-to-nickel interface 70 that separates the nickel-based weldable core portion 44 from the nickel-based cladding 40 that generally surrounds the weldable core portion 44. As mentioned above, the weight percentage of nickel may be lower in the cladding 40, which is outboard of the interface 70, as compared to the weldable core portion 44, which is inboard of the interface 70. The welding surface 64 includes multiple materials for attachment to the spark plug shell 16, but does not substantially include any copper. The phrase "does not substantially include any copper" means that while there may be some copper additives and/or impurities in the nickel-based materials of the weldable core portion 44 and/or the cladding 40, none of the materials that make up the portions of the welding surface 64 are copper-based materials, as is the case where a copper core portion reaches all the way to the welding surface. In the embodiment shown here, the welding surface 64 only includes nickel-based materials, which are preferable for welding to the shell, and does not include any material having 10 wt % or more of copper.

Core interface 48 is the junction or transition within the multi-piece core assembly 38 where the thermally conductive core portion 42 engages the weldable core portion 44. As explained above, core portions 42 and 44 are arranged in series within the multi-piece core assembly 38, and the core interface 48 is the junction where this in-series transition occurs. The location of the core interface 48 may vary depending on the respective sizes of the core portions 42, 44, but it is preferably located 1.02 mm or less (dimension Y) from the welding end 26 of the ground electrode 18, and it is preferably completely encapsulated by the cladding 40. Skilled artisans will appreciate that many ground electrode extrusion processes, such as when a single copper-based billet is extruded within a nickel-based cup or extrudate, an internal void or cavity can inadvertently form if the extrudate does not completely collapse around the billet; these are sometimes referred to as cup collapse voids. Internal or cup collapse voids may be caused by foreign material (e.g., air or oil) that is trapped inside, or material flow that does not completely fill the space, and they can negatively impact the thermal properties of the ground electrode. Because the core interface 48 involves a transition from one extruded billet (core portion 42) to another extruded billet (core portion 44) inside a common extrudate (cladding 40), as will be explained in more detail, the core interface 48 can be formed so that it does not substantially include any internal voids.

The phrase "does not substantially include any internal voids" means that while there may be some minor or negligible voids or spaces between two core portions, there are no internal voids with a major dimension that is greater than 0.20 mm. The "major dimension" of an internal void, particularly an irregular shaped internal void, is the single largest measurable dimension across a cross-section of the internal void. Because the core interface 48 involves an intimate contact between core portions 42 and 44 that does not substantially include any internal voids, the multi-piece core assembly 38 is able to remove heat from the firing end 28 in an effective manner, yet still provide a desirable welding surface 64 that does not substantially include any copper.

Figure 4:
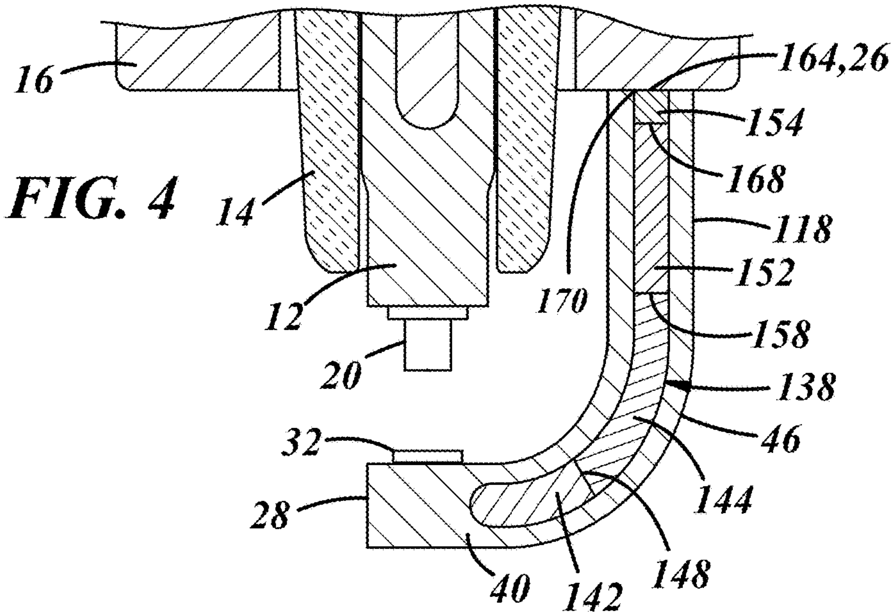
FIG. 4 is an enlarged cross-sectional view of another example of a spark plug having a ground electrode with a multi-piece core assembly, where the core assembly includes several additional core portions.

With reference to FIG. 4, there is shown another example of a ground electrode 118 with a multi-piece core assembly 138, except this core assembly has four separate core portions 142, 144, 152, 154. Unless specifically stated, the features and elements of this embodiment are generally the same as those previously described. As with the previous embodiment, the multi-piece core assembly 138 is designed to maximize both the thermal properties of the electrode, while at the same time providing an advantageous welding surface 164. First core portion 142 may be a thermally conductive core portion and extends from a first end located near the firing end 28 to a second end located at or near the bend 46 in the ground electrode. According to one possibility, first core portion 142 is made of a copper-based material, such as the one described above in conjunction with core portion 42. Second core portion 144 extends from a first core interface 148 to a second core interface 158 and may be made from one of a number of different materials, such as the nickel-based material described above in connection with core portion 44. One possible reason for providing a second core portion 144 in between more thermally conductive core portions 142, 152 is to help aid with the manufacturing of the ground electrode. For instance, the second core portion 144 may be made of a nickel-based or other material that is specifically selected or engineered to assist with the extrusion and/or bending process, while at the same time not substantially impeding the thermal conductivity of the multi-piece core assembly 138. Third core portion 152 may be another thermally conductive core portion and extends from the second core interface 158 to a third core interface 168. In the illustrated example, the third core portion 152 is made from the same or similar copper-based material as the first core portion 142 and has a relatively straight or linear configuration. Lastly, the fourth core portion 154 is preferably a weldable core portion that extends from the third core interface 168 to a welding surface 164 and is made from a nickel-based material, such as that described above for weldable core portion 44. Fourth core portion 154, whose primary function is to provide an advantageous welding surface 164, may be the shortest of the various core portions in terms of axial length.

Like the previous embodiment, welding surface 164 preferably includes a nickel-to-nickel interface 170 at its welding end 26 where it is to be attached to the spark plug shell 16 so as to not substantially include any copper. According to one implementation, none of the core interfaces 148, 158, 168 substantially include any internal voids, but this is not required. It should be appreciated that the multi-piece core assembly 138 may include more or less core portions than the four shown (e.g., three, five, six, etc.). It is also possible for the relative size and/or shape of each of the core portions 142, 144, 152, 154 to differ from those shown. Other changes are certainly possible.

Figure 5:
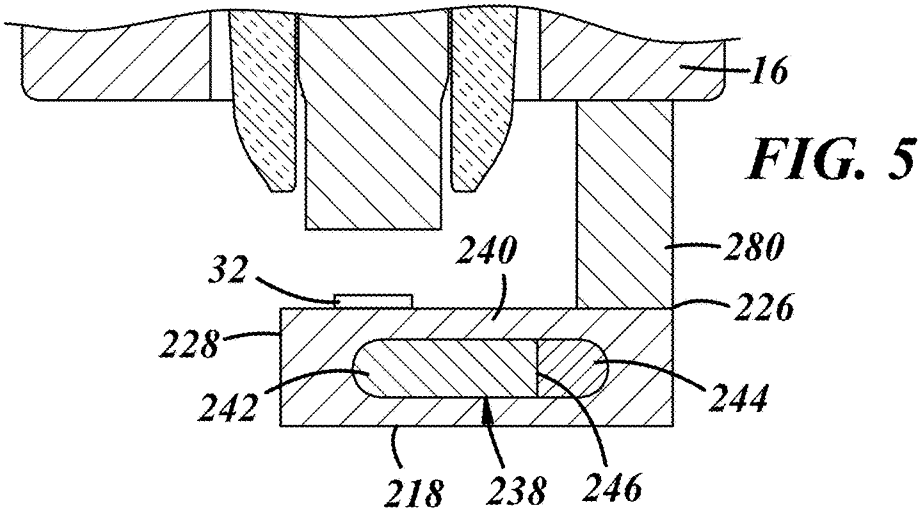
FIG. 5 is an enlarged cross-sectional view of another example of a spark plug having a ground electrode with a multi-piece core assembly, where the ground electrode extends straight in a perpendicular manner to the shell.

Turning now to FIG. 5, there is shown another example of a ground electrode 218 with a multi-piece core assembly 238, except this ground electrode is straight and extends perpendicular to a longitudinal axis of the shell 16, as opposed to a ground electrode that is bent in a standard J-gap formation. This type of ground electrode arrangement may be more suitable for an industrial spark plug, for example. Unless specifically stated, the features and elements of this embodiment are generally the same as those previously described. The multi-piece core assembly 238 at least partially extends between a firing end 228 and a welding end 226, and includes a thermally conductive core portion 242 and a weldable core portion 244 separated by a core interface 248. The thermally conductive core portion 242, which is preferably made of a copper-based material, may extend to a position located directly underneath a firing tip 32, as shown in FIG. 5, or it may terminate short of the firing tip 32. The weldable core portion 244, which can be made of a nickel-based material, is preferably positioned within the ground electrode 218 such that it minimally interferes with a resistance welding or other process of attaching the ground electrode to the shell 16 (e.g., via shell connecting piece 280). In this particular example, the weldable core portion 244 is not exposed at a welding surface. Preferably, the core interface 246 does not substantially include any internal voids, but this is not required.

Figure 6:
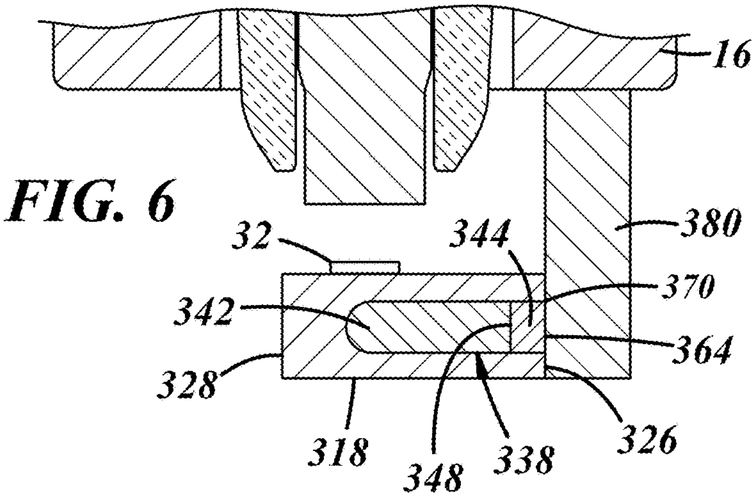
FIG. 6 is an enlarged cross-sectional view of yet another example of a spark plug having a ground electrode with a multi-piece core assembly, where the ground electrode extends straight in a perpendicular manner to the shell.

FIG. 6 shows another example of a ground electrode 318 with a multi-piece core assembly 338 where the ground electrode is straight and perpendicular to a longitudinal axis of the shell 16, except in this embodiment, the weldable core portion contacts the shell or shell connecting piece 380. This type of ground electrode arrangement may also be more suitable for an industrial spark plug. Unless specifically stated, the features and elements of this embodiment are generally the same as those previously described. The multi-piece core assembly 338 at least partially extends between a firing end 328 and a welding end 326, and includes a thermally conductive core portion 342 and a weldable core portion 344 separated by a core interface 348. The thermally conductive core portion 342 is preferably made of a copper-based material and may extend to a position located directly underneath a firing tip 32, as shown in FIG. 6, or it may terminate short of the firing tip 32. The weldable core portion 344 is in intimate contact with the thermally conductive core portion 342 at the core interface 348 and the two core portions are arranged in series within the multi-piece core assembly, as previously explained. Preferable, the core interface 348 does not substantially include any internal voids, but this is not required. The weldable core portion 344 terminates at a welding surface 364 that includes a nickel-to-nickel interface 370, but does not substantially include any copper, as explained above. The welding surface 364 enables the ground electrode 318 to be welded to a shell connecting piece 380 or to the shell directly, in the event that the shell includes a skirt or extension in place of the connecting piece 380. It should be appreciated that, for all intents and purposes, shell connecting piece 280, 380 is treated as if it were part of the shell 16, even if they are two separate pieces. Thus, a weldable core portion that is configured to be welded to a spark plug shell may be configured for welding to the shell directly or to a shell connecting piece.

Turning now to FIG. 7, there is shown a schematic depiction of a method 100 of manufacturing a spark plug electrode, such as spark plug electrode 18 with multi-piece core assembly 38 shown in FIGS. 1-3, that remedies some of the issues described above, particularly those associated with the creation of internal voids. The method is designed to eliminate or at least reduce internal voids at material transitions, such as at the core interface 48 between the core portions 42, 44 and/or at the interface of the cladding 40 and the core portions 42, 44. In addition, the method provides a desirable welding surface 64 that includes a nickel-to-nickel interface 70 for attachment to the spark plug shell 16, but does not substantially include any copper, as defined above.

Beginning with step S1, a thermally conductive material billet 104 and a weldable material billet 106 are inserted into a cladding or sheath cup 108. In a particularly advantageous embodiment, the cladding cup assembly 110 includes a copper-based thermally conductive billet 104, a nickel-based weldable billet 106, and a nickel-based cladding cup 108, wherein the weight percentage of nickel in the weldable billet 106 is greater than the weight percentage of nickel in the cladding cup 108 (e.g., a nickel-based alloy comprising 98 wt % or more nickel is used in the billet 106, whereas a nickel-based alloy comprising 50-90 wt % nickel is used for the cladding cup 108). The plurality of billets 104, 106 in the assembly 110 (it should be appreciated that more than two billets could be provided, as explained above in connection with FIG. 4) leave a small residual cup volume 112. Accordingly, the opening that would otherwise form the internal or cup collapse void 114 is more fully filled. Moreover, using a material such as Ni200 for the billet 106 can help reduce the formation of internal voids 114, as Ni200 is highly extrudable. In one embodiment, the cladding cup 108 and the billet 106 are annealed prior to assembly, whereas the billet 104 is unannealed.

In step S2, the billets 104, 106 are assembled into the cup 108 to form a billet and cladding cup assembly 110. The billet and cladding cup assembly 110 includes the thermally conductive material billet 104, which ultimately forms the thermally conductive core portion 42, in the bottom of the cup volume 112. The other billet 106, which ultimately forms the weldable core portion 44, is situated between the thermally conductive material billet 104 and the cup opening 116. As illustrated in FIG. 7, it is preferable that a small space or clearance be provided at the cup opening 116, as this space can help hold or maintain the assembly 110 in the extrusion die. The assembly 110 is then extruded to form an extrudate 120 having a multi-piece core assembly 38 that is fully embedded in the cladding 40, step S3.

Even if internal or cup collapse voids 114 were to form during extrusion, as schematically represented in FIG. 7, the extrudate 120 can be efficiently processed to trim off an end segment 122 and create the welding end 26 with welding surface 64, step S4. The end segment 122, which can be discarded or recycled, includes material from both the weldable core portion 44 and the cladding 40. The end segment 122 advantageously fully encapsulates the area of internal voids 114 at the end of the core portion 44 of the extrudate 120 that is downstream of the extruding direction 124.

Further, the trimming operation in step S4 forms a welding end 26 with a welding surface 64 that is more suitable for resistance welding. By selecting alloys for the weldable billet 106 that are suitable for resistance welding (e.g., Ni200), a higher weld strength can be achieved while still retaining the performance requirements (e.g., heat and corrosion resistance) of less weldable alloys. In some embodiments, the trimming operation may also trim part of the firing end 28 of the ground electrode 18. The trimmed electrode 18 may be annealed prior to welding to the spark plug shell 16 (e.g., at about 1040° C. for about 20 minutes).

In step S5, the welding end 26 of the ground electrode 18 is finally welded to the shell 16. In the resulting ground electrode 18, there is a strong bond or attachment between the shell 16 and the welding end 26, as there are no internal voids 114 present near the weld junction, and the welding surface 64 includes a nickel-to-nickel interface 70 that does not substantially include any copper, such as from the thermally conductive core portion 42. Further, the welding surface 64 with its nickel-to-nickel interface 70 can provide for a better weld junction than some embodiments in which the welding surface is wholly comprised of a single, lower weight percent nickel material (e.g., embodiments in which the welding surface only includes Inconel 600, 601 or includes a nickel-to-copper interface). The nickel-to-nickel interface 70 is particularly well suited for resistance welding to the steel shell 16; however, other welding methods are certainly possible, such as laser welding to cite one example.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A spark plug electrode, comprising:

a firing end;

a welding end;

a multi-piece core assembly at least partially extending between the firing end and the welding end and having a thermally conductive core portion and a weldable core portion, the thermally conductive core portion has a first end and a second end, is located closer to the firing end than is the weldable core portion, and is configured to conduct heat within the electrode, the weldable core portion has a first end and a second end, is located closer to the welding end than is the thermally conductive core portion, and is configured to be welded to a spark plug shell; and a cladding surrounding the multi-piece core assembly along an entire length of the multi-piece core assembly, wherein the thermally conductive core portion and the weldable core portion are arranged in series within the multi-piece core assembly such that the second end of the thermally conductive core portion is aligned with the first end of the weldable core portion, and material from the weldable core portion and material from the cladding are aligned on a welding surface that is configured to be joined to the spark plug shell.

2. The spark plug electrode of claim 1, wherein the thermally conductive core portion is made of a copper-based material.

3. The spark plug electrode of claim 1, wherein the thermally conductive core portion is longer than the weldable core portion.

4. The spark plug electrode of claim 1, wherein the electrode is a ground electrode and the thermally conductive core portion extends from the thermally conductive core portion first end, through a bend in the ground electrode, and terminates at the thermally conductive core portion second end where there is a core interface with the weldable core portion.

5. The spark plug electrode of claim 4, further comprising a firing tip attached to a side surface of the ground electrode configured to face a spark gap, wherein the first end of the thermally conductive core portion is located between 1.50 mm and 7.00 mm, inclusive, from a distal end surface of the firing end (dimension X) so that it is not located underneath the firing tip, the second end of the thermally conductive core portion is located 1.02 mm or less from a welding surface of the welding end (dimension Y) at a core interface of the thermally conductive core portion and the weldable core portion, and the average thickness of the thermally conductive core portion is between 0.25 mm and 1.52 mm, inclusive (dimension A).

6. The spark plug electrode of claim 1, wherein the weldable core portion is made of a nickel-based material.

7. The spark plug electrode of claim 6, wherein the cladding is made of a different nickel-based material than is the weldable core portion, and the weight percentage of nickel in the weldable core portion is higher than the weight percentage of nickel in the cladding.

8. The spark plug electrode of claim 6, wherein the weldable core portion is made of a nickel-based material that includes 98 wt % or more of nickel.

9. The spark plug electrode of claim 1, wherein the electrode is a ground electrode and the weldable core portion extends from the weldable core portion first end where it is in contact with the thermally conductive core portion and terminates at the weldable core portion second end where the welding surface is configured for attachment to the spark plug shell.

10. The spark plug electrode of claim 9, wherein the first end of the weldable core portion is located 1.02 mm or less from the welding surface of the welding end (dimension Y) at a core interface of the thermally conductive core portion and the weldable core portion, and the average thickness of the weldable core portion is between 0.25 mm and 1.52 mm, inclusive (dimension B).

11. The spark plug electrode of claim 9, wherein the welding surface includes a nickel-to-nickel interface between the weldable core portion and the cladding, but does not substantially include any copper.

12. The spark plug electrode of claim 1, wherein the thermally conductive core portion engages the weldable core portion at a core interface located within the multi-piece core assembly, and the core interface does not substantially include any internal voids.

13. The spark plug electrode of claim 12, wherein the core interface is located 1.02 mm or less from a welding surface of the welding end (dimension Y).

14. The spark plug electrode of claim 12, wherein the core interface is completely encapsulated by the cladding.

15. The spark plug electrode of claim 1, wherein the multi-piece core assembly further includes one or more additional core portion(s) that are arranged with the thermally conductive core portion and the weldable core portion in series within the multi-piece core assembly.

16. The spark plug electrode of claim 1, wherein the electrode is a ground electrode that is straight and extends perpendicular to a longitudinal axis of the shell, the thermally conductive core portion extends from the thermally conductive core portion first end to the thermally conductive core portion second end located at a core interface, the weldable core portion extends from the weldable core portion first end located at the core interface to the weldable core portion second end that includes the welding surface, and the welding surface is configured for welding to at least one of the shell or a connecting piece.

17. The spark plug electrode of claim 16, wherein the welding surface includes a nickel-to-nickel interface between the weldable core portion and the cladding, but does not substantially include any copper.

18. A spark plug, comprising:

the spark plug electrode of claim 1, a metallic shell having an axial bore and a free end;

an insulator at least partially retained within the axial bore of the metallic shell and having an axial bore; and a center electrode at least partially retained within the axial bore of the insulator, wherein the spark plug electrode of claim 1 is a ground electrode and the welding end is welded to the free end of the metallic shell.

19. A method of manufacturing a spark plug electrode, comprising the steps of:

inserting a thermally conductive material billet and a weldable material billet into a cladding cup to form a billet and cladding cup assembly, wherein the thermally conductive material billet is made of a copper-based material and is inserted first into the cladding cup, the weldable material billet is made of a nickel-based material and is inserted second into the cladding cup, and the cladding cup is made of a nickel-based material;

extruding the billet and cladding cup assembly to form an extrudate having a multi-piece core assembly, wherein the thermally conductive material billet becomes a thermally conductive core portion, the weldable material billet becomes a weldable core portion, the cladding cup becomes a cladding that at least partially surrounds the multi-piece core assembly, and the thermally conductive core portion and the weldable core portion are arranged end-to-end within the multi-piece core assembly; and trimming the extrudate through the weldable core portion and the cladding to form a welding surface that includes a nickel-to-nickel interface between the weldable core portion and the cladding, but does not substantially include any copper.

* * * * *